Nov. 2, 1965  R. A. LESTER ETAL  3,214,973
ACOUSTIC FLOW METER FOR MEASURING VERY SLOW FLUID FLOW
Filed Feb. 14, 1963

INVENTORS
ROBERT A. LESTER
JOHN H. THOMPSON

BY *Claude Funkhouser*
ATTORNEY

*James L. Snead* AGENT 3,214,973
ACOUSTIC FLOW METER FOR MEASURING VERY SLOW FLUID FLOW
Robert A. Lester, Pitcairn, and John H. Thompson, Pittsburgh, Pa., assignors, by mesne assignments, to the United States of America as represented by the Secretary of the Navy
Filed Feb. 14, 1963, Ser. No. 258,970
2 Claims. (Cl. 73—194)

This invention relates to an acoustic fluid flow velocity measuring device. More particularly, the present invention relates to a device for accurately measuring fluid flow of slowly moving fluids.

Many devices have been proposed for measuring the velocity of fluid flow. Such devices measure flow by many different means, such as changes in resistance of an element due to fluid flow, changes in magnetic fields within the fluid due to fluid flow, and sonic or acoustic means. However, these prior art devices have been inadequate under the conditions presented for accurately measuring slow fluid flows. Under certain conditions, such as measurements of tides, currents in the ocean, and flows around scale models of boats or other objects, the flow meter must be designed to achieve accuracy of better than 1%, must have no moving parts or sensitive parts which may be harmed by corrosion, must be reliable, and must create minimum disturbance in the fluid flow being measured.

Fluid flow measurement by means of changes in resistance presents the problems of lack of accuracy and the adverse effect of corrosion on the resistance elements. The electromagnetic fluid flow measuring devices are not sufficiently accurate to measure the extremely slow flows with which the present invention is concerned. Prior sonic or acoustic flow meters do not achieve the necessary accuracy due to inadequacies in acoustic transducers and their accompanying circuitry plus inaccuracies due to the non-uniformity of the fluid being measured and the lack of suitable means for calibrating the instrument.

A further problem with the prior art devices lies in the means for achieving calibration of the measuring instrument prior to and during the measuring operation. In fluid flow meters which are used continuously for long periods of time and which are located in inaccessible positions, it is quite inconvenient to remove the sonic transducers from the fluid flow in order to compensate or calibrate the instrument for changes in circuit parameters and fluid characteristics.

Therefore, it is an object of the present invention to provide an accurate device for measuring the flow velocity of slow flowing fluids.

It is another object of the present invention to provide an acoustic flow meter which is simple in construction and durable in use.

It is a further object of the present invention to provide an acoustic flow meter for measuring the velocity of slow fluid flow which may be left in position for extended periods of time and will continuously and accurately measure fluid flow.

Still another object of the present invention is to provide an acoustic flow meter for measuring slow fluid flow which can be calibrated without removing the instrument from the fluid flow.

It is a further object of the present invention to provide an acoustic flow meter for measuring slow fluid which will have an accuracy of better than 1%, which will not be substantially harmed by corrosion, which will be reliable under varying conditions, and which will provide minimum disturbance to the flow which it is measuring.

A better understanding of the present invention may be had by reference to the drawings and the accompanying description wherein.

The principle behind the present flow meter is that there will be a time differential between the transmission and reception of two acoustic waves transmitted at the same time when one wave is transmitted with the direction of fluid flow and the other wave is transmitted against the direction of fluid flow. The underlying operation of the present flow meter is that of measuring the time required for acoustic energy to travel between two probes in one direction and to subtract this time from the time required for acoustic energy to travel between the probes in the opposite direction. The difference in time is measured as a phase difference between the two acoustic waves, and this phase difference is proportional to the velocity of the fluid as will be hereinafter more particularly described in acocrdance with the following equation:

$$V = \frac{C^2}{2L} \Delta t$$

where

V is the velocity of the fluid,
L is the distance between the probes,
C is the velocity of sound in the fluid,
$\Delta t$ is the time difference between the two waves.

As has been hereinbefore mentioned, $\Delta t$ is measured as a phase difference between the two acoustic waves.

Figure 1:
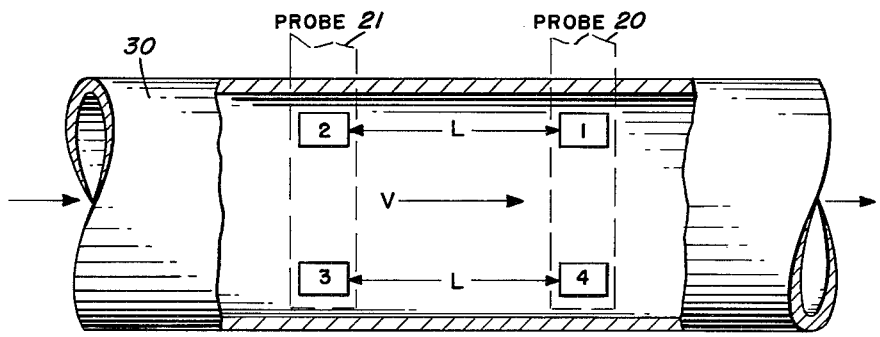
FIG. 1 is a schematic representation of the location of the sonic transducers in the fluid flow.

Referring now to FIG. 1 there is shown a fluid conduit 30 containing fluid traveling with a velocity V, and containing two probes each having two transducers for either transmitting or receiving acoustic energy as will be hereinafter described. It should be noted that conduit 30 is merely an example of one type conduit wherein the present invention has utility, and that any environment having slow moving fluid flow would be suitable for the present invention. The transducers are designated by the numerals 1, 2, 3 and 4, respectively, and are separated by the distance L.

Figure 2:
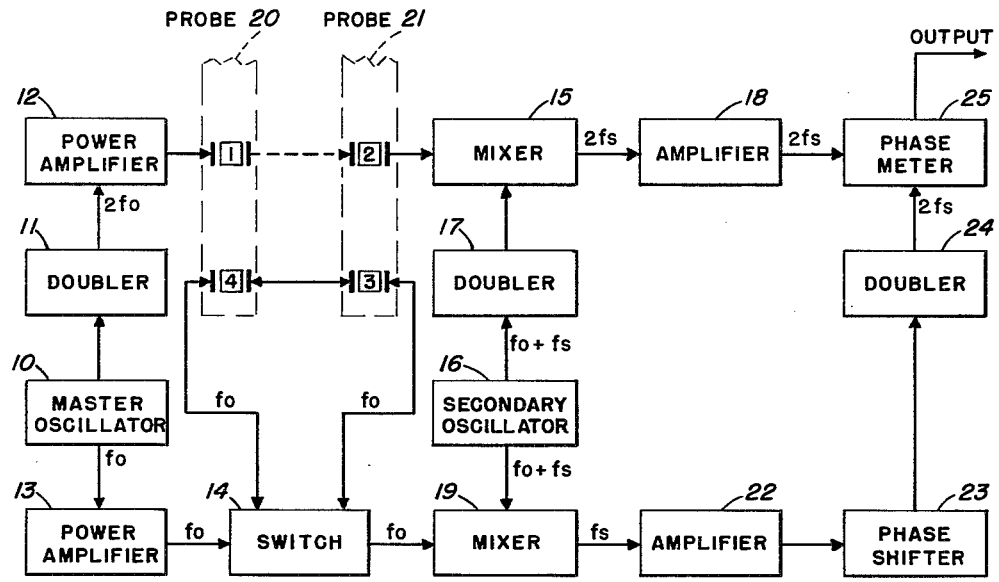
FIG. 2 is a circuit block diagram of the fluid flow meter.

In FIG. 2 a block diagram of the present invention is shown. The flow meter consists of a master oscillator 10 which simultaneously transmits a signal ($f_o$) to power amplifiers 12 and 13. The initial signal has its frequency doubled in doubler 11 prior to being applied to power amplifier 12, and is applied to transducer 1 in probe 20. The acoustic wave generated by transducer 1 is transmitted against the fluid flow to transducer 2 where it is reconverted into an electric signal and applied to mixer 15. A secondary oscillator 16 generates a signal having a frequency $f_o + f_s$. This signal is acted upon by frequency doubler 17 to double its frequency to $2f_o + 2f_s$ and this signal is mixed with the signal $2f_o$ from transducer 2 so that the output from mixer 15, $2f_s$, is applied through amplifier 18 to one side of phase meter 25.

A second acoustic signal is transmitted through the fluid in the direction of fluid flow in the following manner. Master oscillator 10 has a second output which applies signal $f_o$ through power amplifier 13 and double pole double throw switch 14 to transducer 3 in probe 21. This signal is converted into an acoustic signal by transducer 3 and is transmitted through the fluid in the direction of fluid flow to transducer 4 in probe 20 wherein it is reconverted into an electric signal $f_o$. Thence it is transmitted through switch 14 to a second mixer 19. In mixer 19 the signal $f_o$ from transducer 4 is mixed with the signal $f_0+f_s$ from secondary oscillator 16 to produce an output $f_s$. This signal is amplified in amplifier 22, transmitted through phase shifter 23 and frequency doubler 24 to the other side of phase meter 25. The difference in phase between the two signals fed into phase meter 25 is proportional to the velocity of fluid flow in accordance with the above-mentioned equation.

Phase shifter 23 and double pole double throw switch 14 along with the transducers 1, 2, 3 and 4 are essential to the continuous accuracy of the present device. In order to calibrate the phase meter so that the phase difference between the two signals fed into the phase meter is strictly a function of fluid flow velocity and is not affected by inaccuracies in the circuitry or discontinuities in the fluid flow, a means must be provided to calibrate the device rapidly and with minimum disturbance to the system. This calibration is achieved in the present device by means of phase shifter 23 and switch 14 in the following manner.

At zero fluid flow, or any continuous fluid flow, switch 14 is actuated so that an acoustical signal is transmitted in the same direction from both channels between the transducers from probe 20 to probe 21. That is, an acoustic signal is transmitted between transducers 1 and 2 and transducers 4 and 3, respectively. In this manner, any phase shift between the two waves due to the fluid or the circuitry is observed on phase meter 25 and the signal from mixer 19 is shifted in phase to eliminate such phase difference. It can be readily seen that this calibration eliminates any phase shift in the present device due to miscellaneous disturbances in the circuitry or fluid. This calibration can be effective at any time during the operation of the device by simply actuating switch 14 and adjusting phase shifter 23. When it is desired to return the device to its measuring function, switch 14 is returned to its original position and the measuring operation continued.

The phase relations throughout the instrument are as follows:

The output of master oscillator 10 is $f_0$ and is taken as the reference on "zero" phase angle. This signal is applied to power amplifier 12 through doubler 11, and also to power amplifier 13. The output of power amplifier 12 is at most at a constant phase shift from zero. This constant phase shift is compensated for in the calibration procedure. The signal received at transducer 2 from transducer 1 is of a phase angle $\phi_B$ wherein:

$$\phi_B = \frac{2\pi(2f_0)L}{C-V} \text{ radians}$$

After mixing with the doubled output of the secondary oscillator 16, the phase is $\phi_2$ wherein:

$$\phi_2 = \frac{4\pi f_0 L}{C-V} + 2\phi_S$$

wherein $\phi_S$ is the phase of the signal from secondary oscillator 16. This signal, $2f_s$, is applied to one side of phase meter 25.

The phase of the signal from transducer 4 transmitted through the fluid from transducer 3 is $\phi_A$ wherein:

$$\phi_A = \frac{2\pi f_0 L}{C-V} \text{ radians}$$

This signal $f_0$ is mixed in mixer 19 with the signal from the secondary oscillator 16. The output of mixer 19 is then of a phase $\phi$ wherein:

$$\phi = \frac{2\pi f_0 L}{C+V} + \phi_S$$

This phase is doubled in doubler 24 and a signal of the phase $\phi_1$ is applied to the other side of the phase meter 25 wherein:

$$\phi_1 = \frac{4\pi f_0 L}{C+V} + 2\phi_S$$

The output of phase meter 25 is then:

$$\phi_2 - \phi_1 = \frac{8\pi f_0 L V}{C^3} \text{ radians}$$

If $V^2 \ll C^2$ this is the desired output.

As can be seen from the foregoing description of the present invention, the two acoustic signals are transmitted through the fluid at different frequencies. The fluid flow measurement is accomplished in the present invention by using two carrier waves of different frequencies with continuous wave phase techniques. The use of two frequencies prevents cross talk.

The elimination of cross talk is a desirable improvement over other systems which use, for example, two carriers of the same frequency, but pulsed in such a manner to avoid cross talk; or systems having modulated carriers of different frequencies; or systems using phase locked oscillators and memory circuits to store the phase shifts of the pulse technique.

As can be seen from the foregoing description, the present invention provides a fluid flow meter which is capable of measuring very slow fluid flow with a great deal of accuracy. The device may be easily calibrated without removing the sonic probes from the fluid, and the probes themselves are adaptable to measuring over a long period of time and at great depths.

Obviously, many modifications and variations of the present invention are possible in the light of the above teachings. It is therefore to be understood that within the scope of the appended claims the invention may be practiced otherwise than as specifically described.

What is claimed is:

1. In a device for measuring the velocity of flow of fluid, the combination comprising:
   first sonic means for transmitting and receiving acoustic energy through a fluid in a direction opposite the direction of the flow of the fluid;
   second sonic means for transmitting and receiving acoustic energy through the fluid in accordance with the direction of the flow of the fluid;
   said first and said second sonic means having separate means for transmitting and for receiving acoustic energy;
   said transmitting and said receiving means in said sonic means having interchangeable functions;
   said transmitting means being adapted to convert electrical energy into acoustic energy;
   said receiving means being adapted to convert acoustic energy into electric energy;
   phase meter means operably connected to each of the receiving means on said sonic means for indicating the phase difference between the electrical signals received from said first and said second sonic means;
   calibrating means connected to said receiving means to compensate said phase meter means for extraneous errors in the flow measuring system including
   switch means for interchanging the functions of the transmitting and receiving means in said second sonic means whereby said sonic means generates an acoustic signal which passes through the fluid in the same direction as the acoustic signal from first sonic means; and
   phase shift means operably connected to said sonic means for shifting the phase of the electrical signal received from said second sonic means,
   whereby the phase difference between the signals re-received from said first and said second sonic means is proportional to the velocity of flow of said fluid being measured.

2. In a device for measuring the velocity of flow of fluid, the combination comprising:
   signal means for generating an electrical signal having substantially constant frequency;
   first output means on said signal means;

first transmitting transducer means operably connected to said first output means for converting the electrical signal from said signal means into an acoustic signal;

second output means on said signal means;

second transmitting transducer means operably connected to said second output means for converting the electrical signal from said signal means into an acoustic signal;

said first transmitting transducer being positioned in the fluid in such a manner that acoustic energy is transmitted through the fluid in a direction which is opposite to the direction of flow of the fluid;

said second transmitting transducer being positioned in the fluid in such a manner that acoustic energy is transmitted through the fluid in accordance with the direction of the flow of the fluid;

first and second receiving transducer means positioned within the fluid for receiving the acoustic energy from said first and second transmitting transducer means, respectively, and for converting the acoustic energy into electrical signals;

said second transmitting and said second receiving transducers having interchangeable functions so that said second receiving transducer will transmit an acoustic wave in the same direction as said first transmitting transducer and said second transmitting transducer will receive an acoustic signal from said second receiving transducer and convert it into an electric signal;

first and second conversion means connected to said first and second receiving transducer means, respectively, for converting the electrical signals from said first and second receiving transducer means into electric signals of equal frequency and magnitude;

phase meter means having a plurality of inputs for receiving the signals from said conversion means and measuring the phase difference thereof, and calibration means operably connected to said second conversion means to compensate for miscellaneous errors in said device;

said calibrating means comprising switch means connected to said second transmitting and receiving transducers for interchanging the functions thereof, and phase shift means connected to said second conversion means for adjusting the phase of the electric signal from said second conversion means to compensate for miscellaneous errors in said device so that the output of said phase meter is proportional to the velocity of flow of the fluid.

References Cited by the Applicant

UNITED STATES PATENTS

| 2,274,262 | 2/42 | Wolff | 73—194 |
| 2,993,373 | 7/61 | Kritz | 73—194 |
| 3,109,112 | 10/63 | Lester | 73—194 X |

FOREIGN PATENTS

| 623,022 | 5/49 | Great Britain. |

OTHER REFERENCES

Grosso and Spurlick: "The Feasibility of Using Wholly External Ultrasonics to Measure Fluid Flow Within Thick-walled Metal Pipes," Naval Research Laboratory Report 4967, Nov. 12, 1957, 40 pages (pages 36 and 37 relied on).

RICHARD C. QUEISSER, *Primary Examiner.*

DAVID SCHONBERG, *Examiner.*